3,814,638
SOLDERING FLUXES

David Paul Jordan, Warwick, and Laird Gordon Lindsay Ward, Suffern, N.Y., assignors to The International Nickel Company, Inc., New York, N.Y.
No Drawing. Filed May 5, 1972, Ser. No. 250,524
Int. Cl. B23k 35/34
U.S. Cl. 148—23                                            7 Claims

ABSTRACT OF THE DISCLOSURE

Soldering fluxes which have an activity suitable for use in soldering nickel and nickel alloys as well as copper and copper alloys and which are extremely non-corrosive. The fluxes comprise a polymeric imine and a small amount of a chelating agent such as 8-hydroxyquinoline.

---

The present invention is directed to novel and improved compositions for use as soldering fluxes, particularly fluxes for use in soldering nickel and copper lead-frames in electronic circuit boards.

The expression "soldering" as used herein refers to the joining together of metallic surfaces by means of a lower melting metallic filler. In order to obtain a satisfactorily soldered joint it is necessary for the solder to wet the parent metal and to spread and make contact with the joint. Oxide layers inhibit the wetting and spreading and it is a function of a flux to remove the oxide layer and to expose clean metal. Fluxes help maintain a clean surface during the soldering operation by preventing oxidation of the cleaned metal surface and/or oxidation of the filler metal. The flux, while required to be active enough during heating to dissolve the oxides, should revert to an inert, non-corrosive form on cooling so as to minimize, and eleminate if possible, the need for post-soldering cleaning.

The presence of a corrosive residue is a problem particularly applicable to the electronic industry where post-soldering cleaning is extremely difficult and, in some instances, unacceptable because of stringent requirements pertaining to the corrosiveness of the residue itself. The soldered joint must also, of course, be substantially free from defects and the fluxes used must therefore be active enough to clean the metal, but must revert to a non-corrosive residue after soldering. These two properties are generally conflicting and, at present, are not attainable in known flux compositions. Conventional fluxes, such as rosin-based fluxes currently used by the electronic industry, do not leave corrosive residues but they produce joints containing defects caused by inadequate cleaning of the metal surface. These defects must now be discovered visually and repaired manually, a procedure which significantly increases the manufacturing costs to the electronic industry. Other fluxes while active enough to produce satisfactory joints are extremely more corrosive than the fluxes of this invention.

It has now been discovered that the combination of properties of surface cleaning activity and non-corrosiveness of the residue may be brought together in one soldering flux composition.

It is an object of the invention to provide improved soldering fluxes.

Other objects and advantages will become apparent from the following description.

Generally speaking, novel soldering flux compositions of this invention include as active components a polymeric imine and an organic chelating agent. It is believed that the polymeric imine effectively cleans the metal by dissolving oxide layers, e.g., metal oxide, and the organic chelating agent inactivates this metallic ion thus preventing further oxidation caused by the soldering operation.

Examples of polymeric imines which can be employed in the fluxes of the present invention are polyethylenimine, polypropylenimine, 1,2-polybutylenimine, 2,3-polybutylenimine, polyisobutylenimine, polytrimethylenimine, and polyhexamethylenimine, mixtures of these polymers and copolymers of the monomers from which these polymers are derived. The production of these polymers is described in the literature, e.g., in U.S. Pat. No. 3,200,088. Operable polymers in accordance with the concepts of the present invention have a molecular weight greater than about 250.

A polymer found to be operable is Dow Chemical Company's PEI 6 (polyethylenimine). PEI 6 has a molecular weight of about 600 and a viscosity, as measured on the Brookfield viscometer, of about 500–2500 centipoises at 25° C.

Examples of suitable organic chelating agents are 8-hydroxyquinoline, 7-hydroxyindole, 7-hydroxyindolinine, 8-hydroxycinnoline, 8-hydroxyquinazoline, 4 - hydroxyacridine, 4,5-dihydroxyacridine, 1-hydroxycarbazole and 1,8-dihydroxycarbazole.

The carbon atoms contained in the ring structures of the organic chelaters contain bonds satisfied by hydrogen atoms. It will be understood that alkyl radicals (containing from 1 to 15 carbon atoms) may be substituted therefore, but that if such substitution is made at the carbon atom adjacent to the position at which a chelate ring will form the alkyl radicals should not exceed about 2 carbon atoms. Halogen atoms can also be substituted for the hydrogen atoms of the ring structures as will be readily appreciated by those skilled in the art.

It will be noted that these organic chelating agents operable in accordance with the present invention have a structure consisting of a phenolic hydrogen and a nitrogen group so positioned that a five member chelate ring can be formed with the metallic ion. Thus, the metal ion formed by reaction of metal oxide with the polymeric imine is sequestered by the chelating agent and rendered inactive.

While the fluxes of the present invention have been described hereinbefore in terms of the active ingredients thereof, that is, the polymeric imine and the chelating agent, those skilled in the art will appreciate that a flux composition in accordance with the present invention can contain other ingredients which do not detrimentally effect the utility of the flux. For example, large amounts of polar solvent, for example, methanol, ethanol, isopropanol and mixtures thereof in which the polymeric imine and chelating agent are mutually soluble can be used. Such solvents, which may incidentally include water, are readily volatile and thus are not present during soldering. In formulating fluxes in accordance with the present invention it is advantageous to employ about 20 to about 90 parts by weight of polymeric imine for each part by weight of chelating agent. With chelating agents of relatively high molecular weight it is often advantageous to maintain the ratio of polymeric imine to chelating agent at a low value within the foregoing range, for example at about 25 to about 30 parts by weight of polymeric imine to each part by weight of chelating agent. On the other hand, when using a polymeric imine of the group mentioned hereinabove having a relatively low percentage of nitrogen, the ratio of polymeric imine to chelating agent should be at the high side of the aforedisclosed range.

The physical form of the fluxes of the present invention can vary in the same manner as the physical form of fluxes of the prior art. Thus flux formed by melting a polymeric imine and a chelating agent can be used as a core in solder wire. Flux formed by dissolving the essential ingredients in a solvent such as methanol can be used as a mobile fluid adapted to be brushed or sprayed in place and to become immobile by solvent evaporation. Flux in accordance with the present invention can also be formulated as a paste for use in the same manner as flux pastes of the prior art.

Tin-lead solders with which the fluxes of the invention can be used can contain in percent by weight from about 30% to about 70% tin with the remainder lead. Small additions of other metals may be present such as, e.g., up to about 2% antimony, up to about .25% bismuth and up to about 4% silver.

Other solders which melt in the range of about 200° C. to about 300° C. and thus can be used with the fluxes of the present invention include tin-silver and tin-zinc alloys.

The soldering fluxes of the invention are particularly useful in connection with soldering of nickel and nickel alloys and with copper and copper alloys.

Advantageous fluxes in accordance with the present invention contain about 20 to about 90 parts by weight of polyethylenimine having a molecular weight of about 600 and about 1 part by weight of 8-hydroxyquinoline. The two ingredients are advantageously dissolved in a polar solvent and applied to a metal surface by brushing or spraying.

For the purpose of giving those skilled in the art a bettter understanding of the invention, and/or a better appreciation of the invention, the following example is given.

EXAMPLE

A flux of the invention was prepared by dissolving 99 parts by weight of polyethylenimine and 2 parts by weight of 8-hydroxyquinoline in 99 parts by weight of methanol at room temperature. The flux was evaluated for the promotion of solderability by observation of the wetting of treated samples by the solder. Table I sets forth in percent by weight the nominal compositions of the alloys soldered.

TABLE I

| Alloy | Ni | Cu | Fe | Co | Mn | Si |
|---|---|---|---|---|---|---|
| 1 | .1 | 99.+ | <.1 | <.1 | <.1 | <.1 |
| 2 | 99.+ | <.25 | .20 | | .18 | .18 |
| 3 | 99.97+ | <.01 | .003 | .001 | <.001 | <.001 |
| 4 | 42. | | Bal. | | .2 | .2 |
| 5 | 50. | | Bal. | | .18 | .18 |
| 6 | 29. | | Bal. | 17. | .2 | .2 |

Samples of the aforelisted alloys were held for one hour over boiling distilled water to stimulate six-months of shelf storage (aging). The samples were then dipped briefly into the flux solution and held under an infrared heater to about 10 seconds during which time the solvent evaporated and the soldering flux attained a temperature of about 100° C. The samples were then immersed in 60–40 lead-tin solder at 260° C. Total wetting (100%) was observed, i.e., the sample surfaces were completely coated with mirror-bright solder without pinholes.

The non-corrosive nature of the flux was demonstrated by using the copper mirror test as follows:

One drop of the flux solution was placed on a glass slide coated with a layer of copper 400 angstroms thick. After 24 hours the slide was reexamined and although the copper under and around the drop of flux was discolored, the copper surface remained intact. This test is a very severe one and only fluxes of extremely low corrosivity, such as water white rosin, can pass it by not penetrating the copper film.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A soldering flux containing about 20 to about 90 parts by weight of a polymeric imine having a molecular weight greater than about 250 and about one part by weight of a chelating agent selected from the group consisting of 8-hydroxyquinoline, 7-hydroxyindolinine, 8-hydroxycynnoline, 8-hydroxyquinazoline, 4-hydroxyacridine, 4,5-dihydroxyacridine, 1-hydroxycarbazole, and 1,8-dihydroxycarbazole.

2. A soldering flux of claim 1 wherein the polymeric imine is selected from the group consisting of polyethylenimine, polypropylenimine, 1,2-polybutylenimine, 2,3-polybutylenimine, polyisobutylenimine, polytrimethylenimine, and polyhexamethylenimine.

3. A soldering flux of claim 1 wherein the polymeric imine is polyethylenimine.

4. A soldering flux of claim 1 where the chelating agent is 8-hydroxyquinoline.

5. A soldering flux of claim 2 wherein the chelating agent is 8-hydroxyquinoline.

6. A soldering flux of claim 3 wherein the chelating agent is 8-hydroxyquinoline.

7. A soldering flux as in claim 6 wherein the polyethylenimine and the 8-hydroxyquinoline are copresent in a ratio of parts by weight 20 to about 90 of polyethylenimine to 1 of 8-hydroxyquinoline.

References Cited

UNITED STATES PATENTS

| 3,251,778 | 5/1966 | Dickson | 260—2 EN |
| 3,354,103 | 11/1967 | White | 260—2 EN |
| 3,313,779 | 4/1967 | White | 260—2 EN |
| 3,511,645 | 5/1970 | Goni | 75—101 R |
| 3,099,590 | 7/1963 | Laudenslager | 148—23 |
| 2,978,369 | 4/1961 | Battle | 148—23 |
| 3,200,088 | 8/1965 | Tousignant | 260—2 |
| 3,565,800 | 2/1971 | Wade | 252—1 |
| 3,282,851 | 11/1961 | Muehlberg | 260—2 |

L. DEWAYNE RUTLEDGE, Primary Examiner

P. D. ROSENBERG, Assistant Examiner

U.S. Cl. X.R.

260—2 EN